United States Patent
Terajima

(10) Patent No.: US 7,760,384 B2
(45) Date of Patent: Jul. 20, 2010

(54) IMAGE PROCESSING METHOD, IMAGE PROCESSING APPARATUS, AND CONTROL PROGRAM FOR IMAGE PROCESSING APPARATUS

(75) Inventor: Hisao Terajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 680 days.

(21) Appl. No.: 11/409,983

(22) Filed: Apr. 25, 2006

(65) Prior Publication Data

US 2006/0187494 A1    Aug. 24, 2006

Related U.S. Application Data

(63) Continuation of application No. PCT/JP2005/023209, filed on Dec. 13, 2005.

(30) Foreign Application Priority Data

Dec. 13, 2004  (JP) .............................. 2004-359287

(51) Int. Cl.
G06F 3/12    (2006.01)
(52) U.S. Cl. ..................... 358/1.15; 358/1.9; 358/1.12; 358/302
(58) Field of Classification Search ................ 358/302, 358/1.1, 1.9, 1.13–1.16, 1.18, 407, 487; 355/27, 40–41; 348/348
See application file for complete search history.

(56) References Cited

U.S. PATENT DOCUMENTS

| | | | |
|---|---|---|---|
| 6,535,298 B2 | 3/2003 | Winter et al. .............. 358/1.16 |
| 6,744,529 B2 | 6/2004 | Winter et al. .............. 358/1.15 |
| 6,748,097 B1 * | 6/2004 | Gindele et al. .............. 382/112 |
| 6,956,671 B2 | 10/2005 | Monty et al. .................. 358/1.9 |
| 7,084,954 B2 * | 8/2006 | Kito ............................. 355/40 |
| 7,142,318 B2 * | 11/2006 | Lopez et al. ................ 358/1.15 |
| 7,212,233 B2 * | 5/2007 | Nakamura ............... 348/221.1 |
| 7,315,391 B2 * | 1/2008 | Nakano et al. ............. 358/1.15 |
| 2001/0040685 A1 | 11/2001 | Winter et al. ................. 358/1.6 |
| 2004/0047001 A1 * | 3/2004 | Gehring et al. ............ 358/1.18 |
| 2004/0190059 A1 | 9/2004 | Winter et al. .............. 358/1.15 |
| 2004/0239957 A1 * | 12/2004 | Ohtsuka ..................... 358/1.1 |

(Continued)

FOREIGN PATENT DOCUMENTS

JP    09-281605    * 10/1997

(Continued)

*Primary Examiner*—Mark K Zimmerman
*Assistant Examiner*—Dung D Tran
(74) *Attorney, Agent, or Firm*—Fitzpatrick, Cella, Harper & Scinto

(57) ABSTRACT

In an image processing apparatus, the image data to be recorded/output by an image recording means is specified by information stated on a mark sheet that is read from an image reading means. The image data to be printed/output is analyzed, the number of people in the photographic object in the image data is detected, and a thumbnail image of the image is printed together with a mark sheet having mark areas in which the number of prints of the image can be specified in correspondence to the number of people in the photographic object obtained by detecting the number of faces from the image data or by another method. The mark sheet is read by an image reading means, and an image of the number of prints corresponding to the number of people in the photographic object is printed.

9 Claims, 7 Drawing Sheets

U.S. PATENT DOCUMENTS

| | | | |
|---|---|---|---|
| 2005/0063012 A1* | 3/2005 | Fujinaga | 358/1.18 |
| 2005/0168779 A1* | 8/2005 | Tsue et al. | 358/1.18 |
| 2005/0185204 A1* | 8/2005 | Shelton et al. | 358/1.13 |
| 2005/0219587 A1* | 10/2005 | Hayaishi | 358/1.9 |
| 2006/0007485 A1* | 1/2006 | Miyazaki | 358/1.15 |
| 2006/0227385 A1* | 10/2006 | Kawada | 358/302 |

FOREIGN PATENT DOCUMENTS

| | | |
|---|---|---|
| JP | 10-214003 | 8/1998 |
| JP | 2002-273973 | 9/2002 |
| JP | 2004-145563 | 5/2004 |

* cited by examiner

① ② ③ ⑤   ① ② ③ ④   ① ② ③ ⑦   ① ② ③ ④
2004.06.21  2004.06.21  2004.06.21  2004.06.21 ns*# IMAGE PROCESSING METHOD, IMAGE PROCESSING APPARATUS, AND CONTROL PROGRAM FOR IMAGE PROCESSING APPARATUS

This application is a continuation of International Application No. PCT/JP2005/023209, filed on Dec. 13, 2005, which claims the benefit of Japanese Patent Application No. 2004-359287 filed on Dec. 13, 2004.

BACKGROUND OF THE INVENTION

1. Field of the Invention

The present invention relates to an image processing method, an image processing apparatus, and a control program for an image processing apparatus whereby image data to be printed/output by an image recording means is specified using information stated on a mark sheet read from an image reading means.

2. Related Background Art

Conventionally, when photographs taken with a digital camera are printed, the image file and the number of prints can be specified by using application software on a PC that can print the image file. In recent years, so-called photo direct printers and multifunction printers (hereinafter abbreviated as MFP) have appeared that are equipped with a memory card for storing images taken with a digital camera and that can print image files stored in the memory card. So-called photo direct printers and MFP have also appeared that can directly connect to the digital camera by way of a USB cable or the like, and that can print image files stored in the memory of the digital camera. With these photo direct printers and MFP, a user can specify the image file and the number of prints from an operation panel.

With an MFP having a scanner means, it is possible to print a mark sheet (also referred to as an order sheet, or the like) that contains mark areas and thumbnail images of photographic images such as FIG. 7. The user can mark the mark area of the mark sheet, and thereafter print the marked photographs by reading the mark sheet with the MFP scanner (refer to Japanese Patent Application Laid-open No. 2002-273973).

A mark area for various print settings (for specifying sheet size and options) such as those shown in the diagram is disposed in the section A of FIG. 7, and disposed therebelow are thumbnail images B, and mark areas C that correspond to the thumbnail images B. The three marks in each of the mark areas C are used for specifying the number of prints of the corresponding thumbnail images B, and the marks correspond to, beginning from the left, one, two, and three prints. When the user fills in the mark designating the number of prints that are desired and then has the MFP scanner read the sheet, the specified number of prints of the specified image can be printed. A mark area D for specifying the paper ejection method and sheet reprinting is disposed in the lower section of the mark sheet.

Such a mark sheet is convenient in that the images can be compared while making choices, and print images can be selected because the list of images can be viewed. There is an additional advantage in that photo printing operation is possible without the use of an LCD or another display unit in the main operation unit.

When printing instructions are provided by using a conventional mark sheet such as that shown in FIG. 7, however, the maximum number of prints is limited to several prints. In the example of FIG. 7, for example, since the number of prints "1" corresponds to a single mark, ten mark areas are needed to be able to print 10 prints, and the required area for the mark areas is increased. Even if marks for specifying the number of prints are additionally provided in units of 5 and 10, or if another method is used, there is a drawback in that there is a limit to the space for disposing the marks, and handling becomes complicated.

For example, in FIGS. 3 and 4 of Japanese Patent Application Laid-open No. 2002-273973, an example is shown in which the surface area of the mark area and the surface area of the thumbnail image are equal, but in comparison with FIG. 7, the number of images that can be printed on a single page is visibly lower. If the number of images that can be printed on a single page is low, the listing ability is reduced and made inconvenient. In other words, the user must perform laborious operations in that the desired images must be selected from images that span a plurality of pages. There is also a drawback in that waiting time is increased because the time required to print a mark sheet is increased. If the size of the thumbnail images is reduced, the increased mark surface area can be offset and the listing ability maintained, but there is a problem in that it is difficult to discriminate the images and image selection itself becomes difficult.

It is therefore difficult to specify the printing of several prints and to fixedly create a general-use mark sheet format.

On the other hand, when one has made a trip with many friends, for example, it is common to distribute photos to people in the photographs. When there are three people in photo 1, ten people in photo 2, and five people in photo 3, then three, ten, and five prints of the respective photos must be printed in order to distribute the photos to the people in the photographs.

Since there are only marks for three prints in the mark areas C of the mark sheet of FIG. 7, when the mark sheet of FIG. 7 is used to carry out printing, one of the following procedures must be used to read the mark sheet in order to print three, ten, and five prints of the respective photographs.

Procedure 1: First, three prints of photo 1 are printed, ten prints of photo 2 are then printed, and lastly, five prints of photo 3 are printed. Prepared in the procedure 1 are a mark sheet for printing three prints of photo 1, a mark sheet for printing three prints of photo 2, a mark sheet for printing one print of photo 2, a mark sheet for printing three prints of photo 3, and a mark sheet for printing two prints of photo 3. These mark sheets are then read one, three, one, one, and one times, respectively, to carry out printing. In the operation of procedure 1, since a large number of sheets (five) must be prepared and the number of times (seven) that the sheets must be read is large, the operation is very laborious.

Procedure 2: First, three prints each of photos 1, 2, and 3 are printed, three prints of photo 2 and two prints of photo 3 are subsequently printed, three prints of photo 2 are then printed, and lastly, a single print of photo 2 is printed. Prepared in the procedure 2 are a mark sheet for printing three prints each of photos 1, 2, and 3, a mark sheet for printing three prints of photo 2 and two prints of photo 3, a mark sheet for printing three prints of photo 2, and a mark sheet for printing a single print of photo 2. These mark sheets are each then read a single time to carry out printing. In the operation of procedure 2, four sheets are prepared and the reading must be performed four times. In comparison with procedure 1, the required number of mark sheets and the required number for reading operations are less, but the user feels that each of the number of sheets and the number of reading operations is considerable, giving the impression that the operation is very laborious.

The techniques for printing photos for several people appearing in a photographic object are known in the art. Disclosed in Japanese Patent Application Laid-open Nos.

2004-145563 and H10-214003, for example, are techniques for detecting the number of people in a photographic object by detecting the number of faces in an image, areas of skin color, and the inherent shape patterns of people by using image recognition processes. However, these known techniques are configured so as to immediately print photos for the detected number of people, and this approach cannot solve the problems in a configuration in which the mark sheet described above is used, and neither is there a solution suggested or intimated in these known references.

SUMMARY OF THE INVENTION

An object of the present invention is to solve the above-described problems and to provide a way to suitably control the format of the mark sheet for specifying the image file of the photographs to be printed and the number of prints.

In order to solve the above-described problems, a configuration is adopted in the present invention that provides an image processing method, an image processing apparatus, and a control program for an image processing apparatus whereby image data to be recorded and output by an image recording means is specified based on information stated on a mark sheet read from the image reading means, comprising analyzing the image data to be printed/output and detecting the number of people in the photographic object in the image data; and printing a thumbnail image of the image and a mark sheet having a mark area in which the number of prints of the image can be specified in correspondence to the number of people in the photographic object detected from the image data.

In accordance with the above-described configuration, the format of the mark sheet for specifying the number of prints of the image of the photo to be printed can be suitably controlled, and printing for a number of people can be carried out in a simple manner while preventing a reduction in the listing ability of the mark sheet. Also provided is an excellent effect in which the number of prints for the number of people foreseen to be needed can easily be specified in the mark area with a low surface area.

BRIEF DESCRIPTION OF THE DRAWINGS

FIG. 7 is a descriptive diagram showing the configuration of a conventional mark sheet;

DESCRIPTION OF THE PREFERRED EMBODIMENTS

Embodiments related to the MFP incorporating both an image reading means and a printer means are described below.

Embodiment 1

Figure 1:
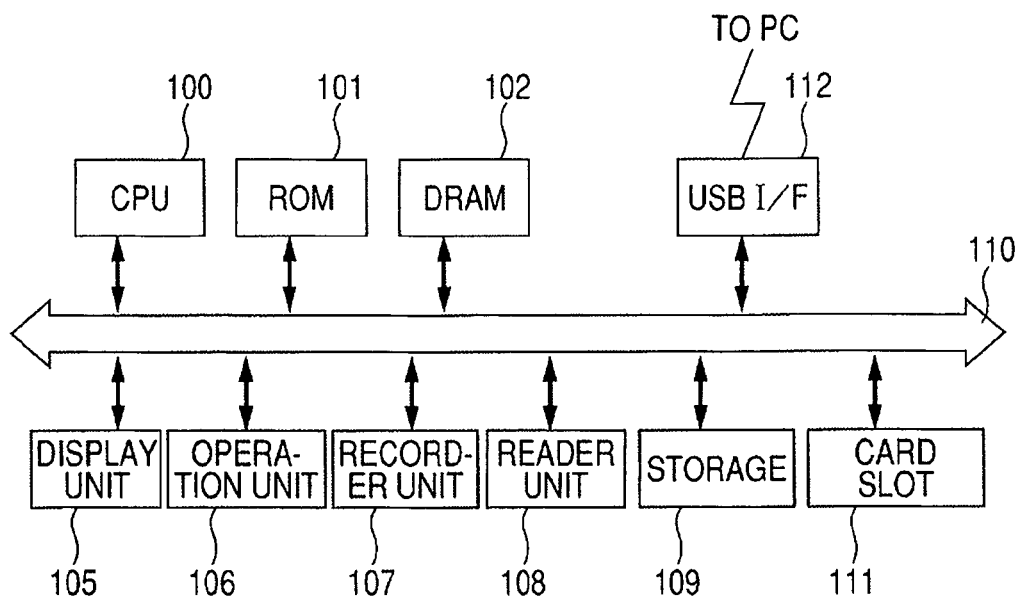
FIG. 1 is a block diagram showing the configuration of the control system of the MFP in which the present invention is adopted.

FIG. 1 shows the configuration of the control system of the MFP in which the present invention is adopted. In FIG. 1, the reference numeral 100 is a central processing unit (CPU), 101 is a ROM for storing programs and data, and 102 is a storage unit (DRAM) for storing CPU work data, display data, image data, and other data.

Reference numeral 105 is a display unit that has an LCD or the like for displaying the apparatus status and operating instructions, 106 is an operation unit having cursor keys and the like, 108 is a color reader unit that has a color CCD or the like, 107 is a printer or another recorder unit, 109 is a storage having an HDD or the like, 111 is a card slot that can read the memory card of a digital camera or the like, and 112 is a USB interface for connecting to a PC when the MFP is used as a scanner, printer, or memory card reader.

The above-described components are connected by a system bus 110.

Figure 2:
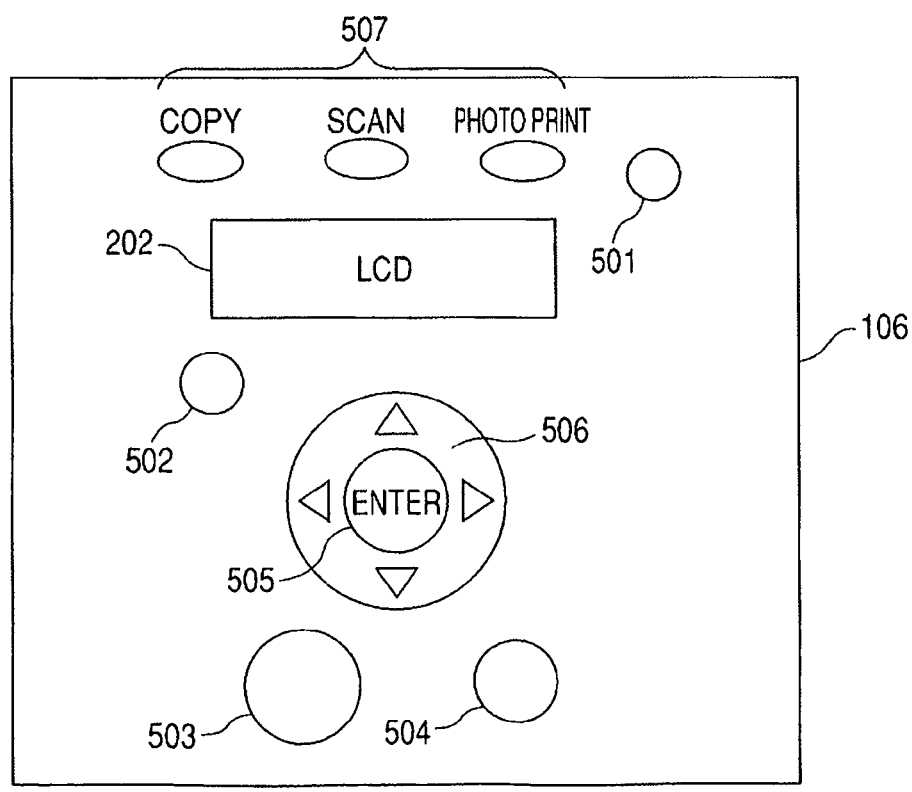
FIG. 2 is a descriptive diagram showing the configuration of the operation unit of the apparatus of FIG. 1.

FIG. 2 shows the configuration of the operation unit 106 of the MFP. The operation unit 106 of FIG. 2 is provided with an LCD 202 for displaying the above information, and mode keys 507 for specifying the operating mode of the MFP. The operation unit 106 of FIG. 2 is provided with a menu key 502 for entering various setting modes, scroll keys 506 for moving to setting items and modifying values, and an enter key 505, which is a setting input key. The operation unit 106 of FIG. 2 is provided with a start key 503 for starting copying, scanning, and other jobs, a cancel key 504 for canceling jobs and resetting the settings, and other keys.

The mode keys 507 include three keys for setting three modes in the present embodiment: copy, scan, and photo print. The same reference numeral 507 is used hereinbelow even when referring to each of these mode keys.

Described next is the operation of the printing function for the desired number of people, in which the mark sheet in the present MFP is used.

First, when a memory card in which photo images from a digital camera are stored is mounted in the card slot of the present MFP, the photo image data on the memory card is automatically copied to the storage of the MFP or copied by user instruction from the operation panel. Alternatively, in a configuration in which a direct connection is made to the digital camera via USB or another connection, the photo image data is similarly copied from the storage device of the digital camera to the storage of the MFP.

The control program executed by the CPU 100 of the present MFP is stored in the ROM 101 and is executed in a real-time operating system (RTOS), which is also stored in the ROM 101. The RTOS periodically executes an idle task such as that shown in FIG. 3 when copying, printing, or another job is not being carried out.

Figure 3:
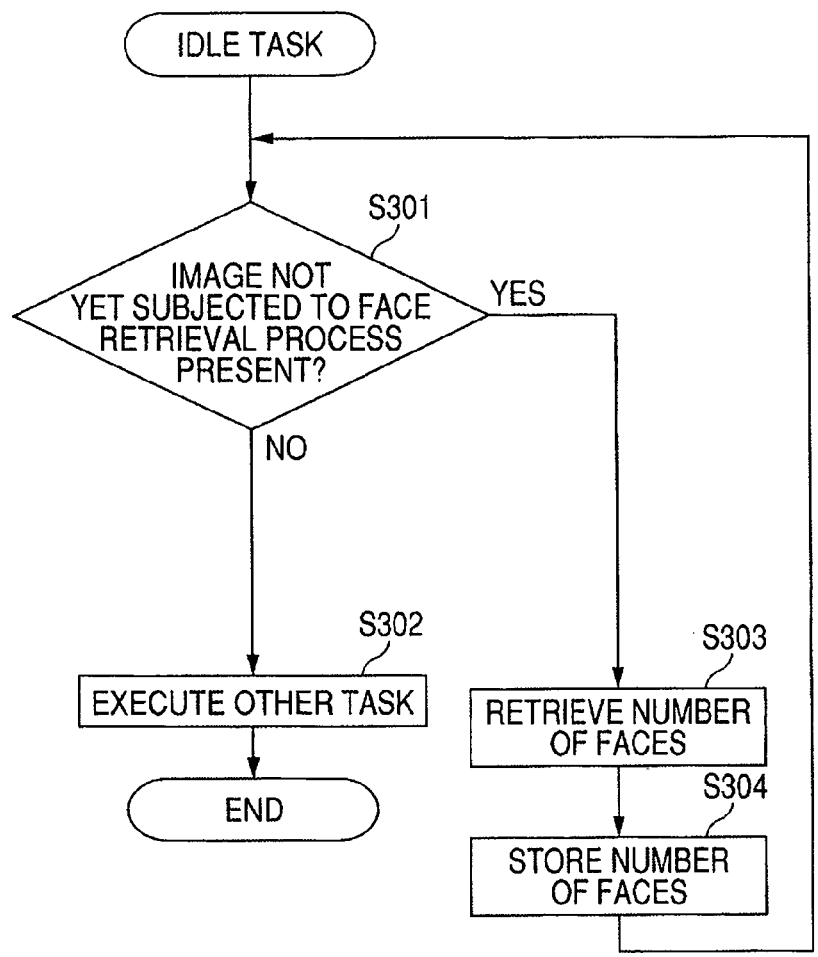
FIG. 3 is a flowchart showing the flow of the idle task in the apparatus of FIG. 1.

Here, the idle task is described with reference to FIG. 3

In the idle task, first, the header portion of the image file is checked in step S301, and a confirmation is made as to whether information on the number of faces contained in the image is present in the JPEG header (EXIF header) of the image. If the information on the number of faces is present in the JPEG header of all the image files, another idle task is executed in step S302, and if there is an image file in which information on the number of faces is not present, the number of faces is detected in step S303. The process for detecting the number of faces of step S303 is carried out in the following manner.

Since the image file of the digital camera is ordinarily compressed using the JPEG method, image processing cannot be performed in the unchanged JPEG format. In view of this fact, the image data file stored in the storage 109 is JPEG-expanded and developed in the DRAM 102 (the JPEG expansion process is carried out by firmware stored in the ROM 101, but a hardware CODEC may also be installed). The process for detecting the number of faces is performed on the expanded photo image data.

The process for detecting the number of faces is performed by a firmware process of the CPU 100 (however, the process may be carried out by hardware in the same manner as described above). The detection algorithms described in Japanese Patent Application Laid-open Nos. 2004-145563 and H10-214003 may be adopted in which the areas of skin color, the facial contours of people, and other inherent shape patterns are detected. The detection of the image portions of the faces and the detection itself of the number of faces are known, and a detailed description thereof is omitted.

When the number of faces is detected from the image in step S303, the information on the number of faces is written in the application marker area in the header of the JPEG file in the source storage 109 in step S304, even if no faces have been detected. The image information and number of faces information is thereby made present in a single file, and it is possible to provide and store a correspondence between the image and number of faces by using this information.

When the process for storing the number of faces of step S304 has been completed, the idle task returns to step S301 and detects the next image for which the process for detecting faces has been yet been carried out, and if there is such an image, the detection process is carried out again in step S303.

If there is no unprocessed image, another process for performing an idle task is carried out in step S302, and then the idle task is ended. The process for detecting the number of faces in the photo image file copied from the card slot to the storage 109 can be ended if a certain amount of time has elapsed after copying. Thus, by detecting the information on the number of faces as an idle task, the process for detecting the number of faces can be carried out without special user operation.

It is also possible to distribute the system load and to use resources effectively. In other words, the information on the number of faces is referred to when the mark sheet is printed as described above, but a considerable amount of time is required to print the mark sheet when the process for detecting the number of faces is carried out during mark sheet printing. This is due to the fact that since several seconds or more of time is required per photo when the process for detecting faces is performed by the CPU of a common MFP, a considerable amount of time is required to print a mark sheet containing several tens of images. Therefore, the process for detecting the number of faces is preferably carried out in advance to the extent possible, and the problem can be solved by executing the process for detecting the number of faces as an idle task as described above.

Figure 7:
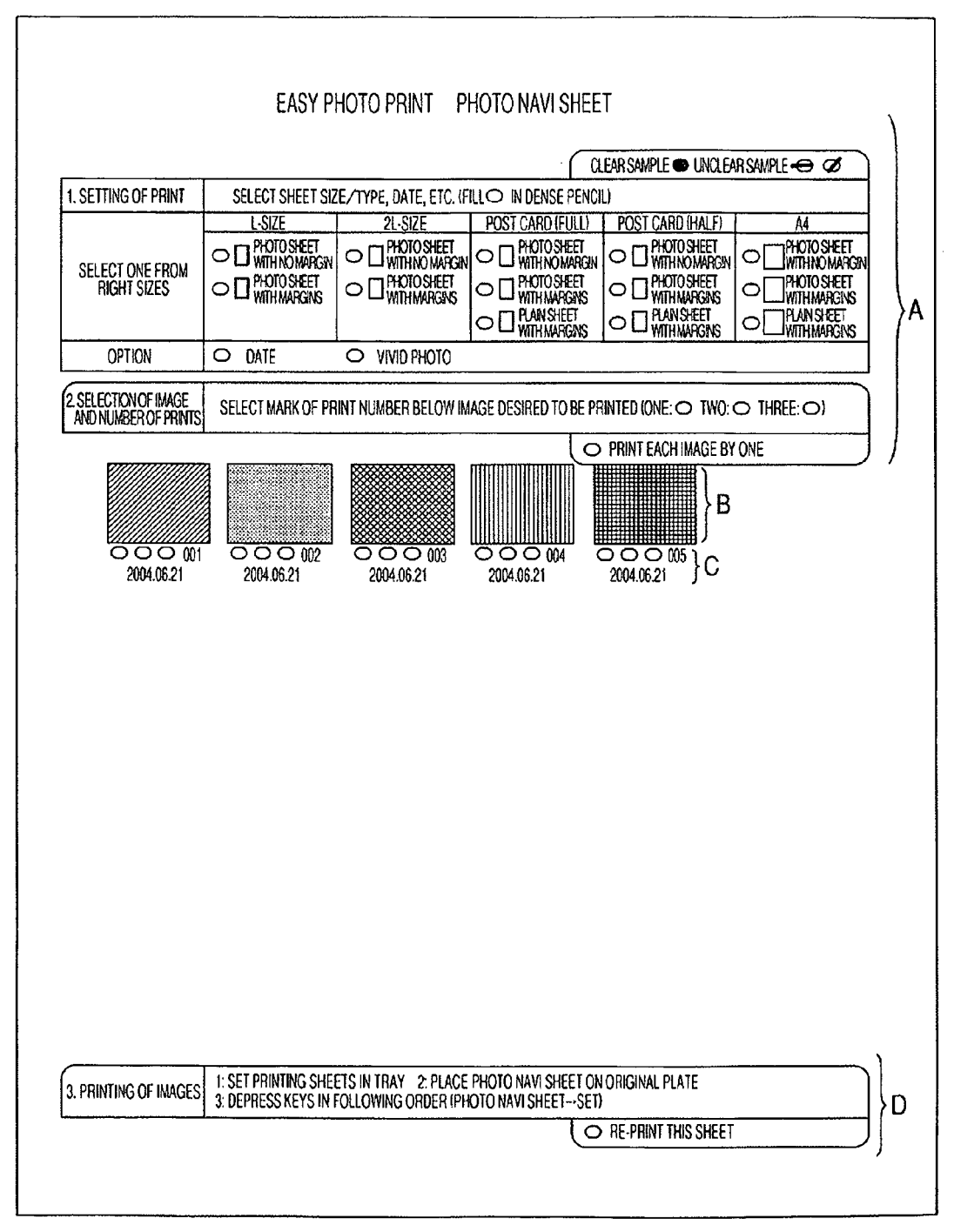

Next, the process for printing a mark sheet is described again with reference to FIG. 5. The overall format of the mark sheet printed in the present embodiment is the same as that shown in FIG. 7. In particular, the mark areas A and D are the same as those in FIG. 7.

Figure 5:
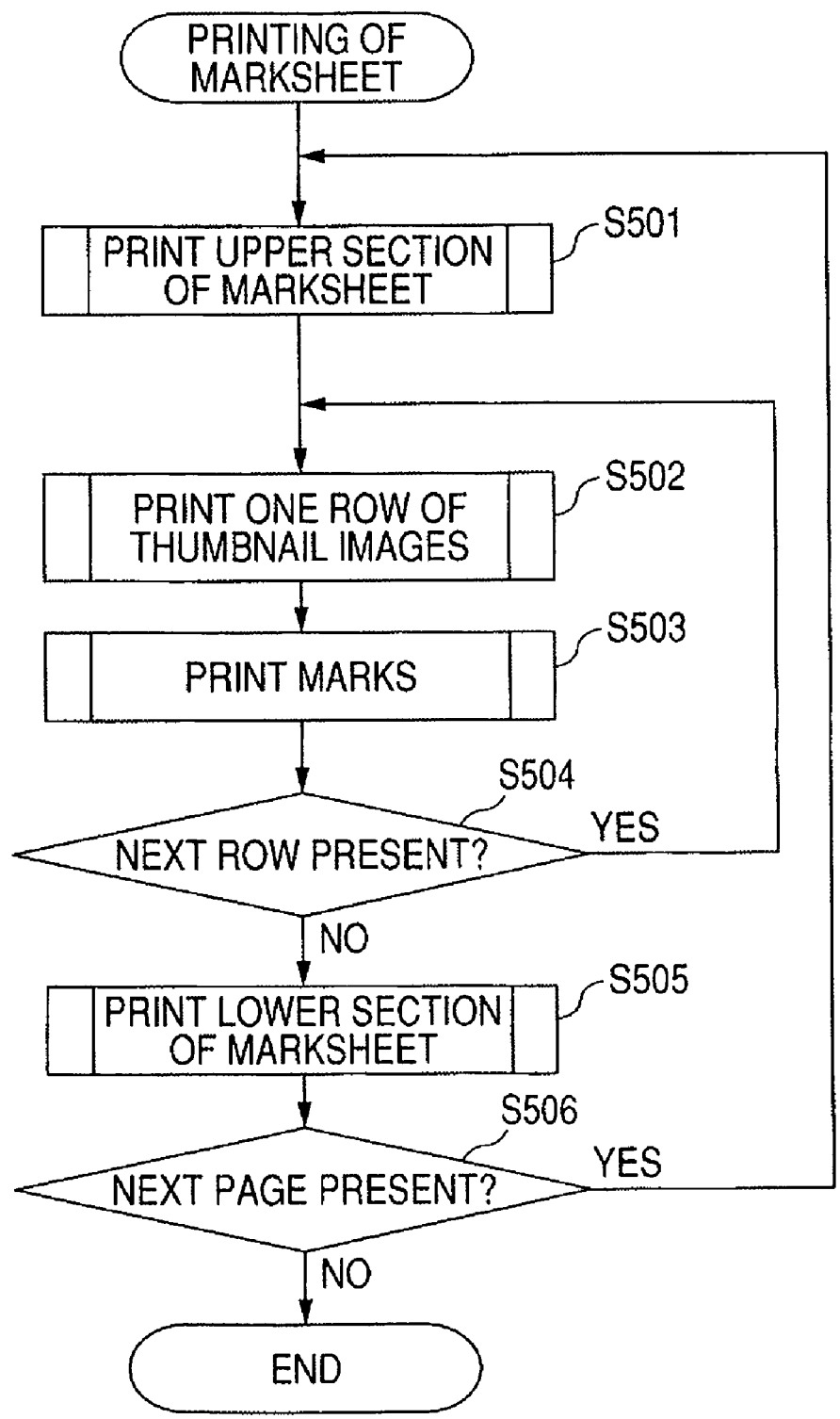
FIG. 5 is a flowchart showing the mark sheet printing process in the apparatus of FIG. 1.

The user presses the photo print key 507 of FIG. 2 on the operation unit 106 when a mark sheet is to be printed. The mark sheet printing job of FIG. 5 is started when the mark sheet key 501 is subsequently pressed.

Section A of the mark sheet (FIG. 7) is printed first in step S501. A single line (single row) of the thumbnail portion of section B of the mark sheet (FIG. 7) is subsequently printed in step S502. Next, the section C of the mark sheet (FIG. 7) for specifying the number of prints is printed in correspondence with the thumbnails in step S503. However, in the case of the present embodiment, the thumbnail section (B) and the mark area (C) for specifying the number of prints has a format that is different from a conventional format, as described below (the process of step S503 is described in greater detail below with reference to FIG. 6).

Next, steps S502 to S504 are repeated until a prescribed number of rows (lines) of thumbnails have been printed. When the prescribed number of rows has been printed, section D of the mark sheet is printed in step S505 to complete the printing of a single sheet.

Next, in step S506, due to the fact that when the thumbnails to be printed cannot fit on a single mark sheet, and due to other circumstances, a determination is made as to whether a mark sheet should be printed on the next page. In the case that a next page is present, the process is repeated from step S501 and if a next page is not present, the process is ended.

Figure 6:
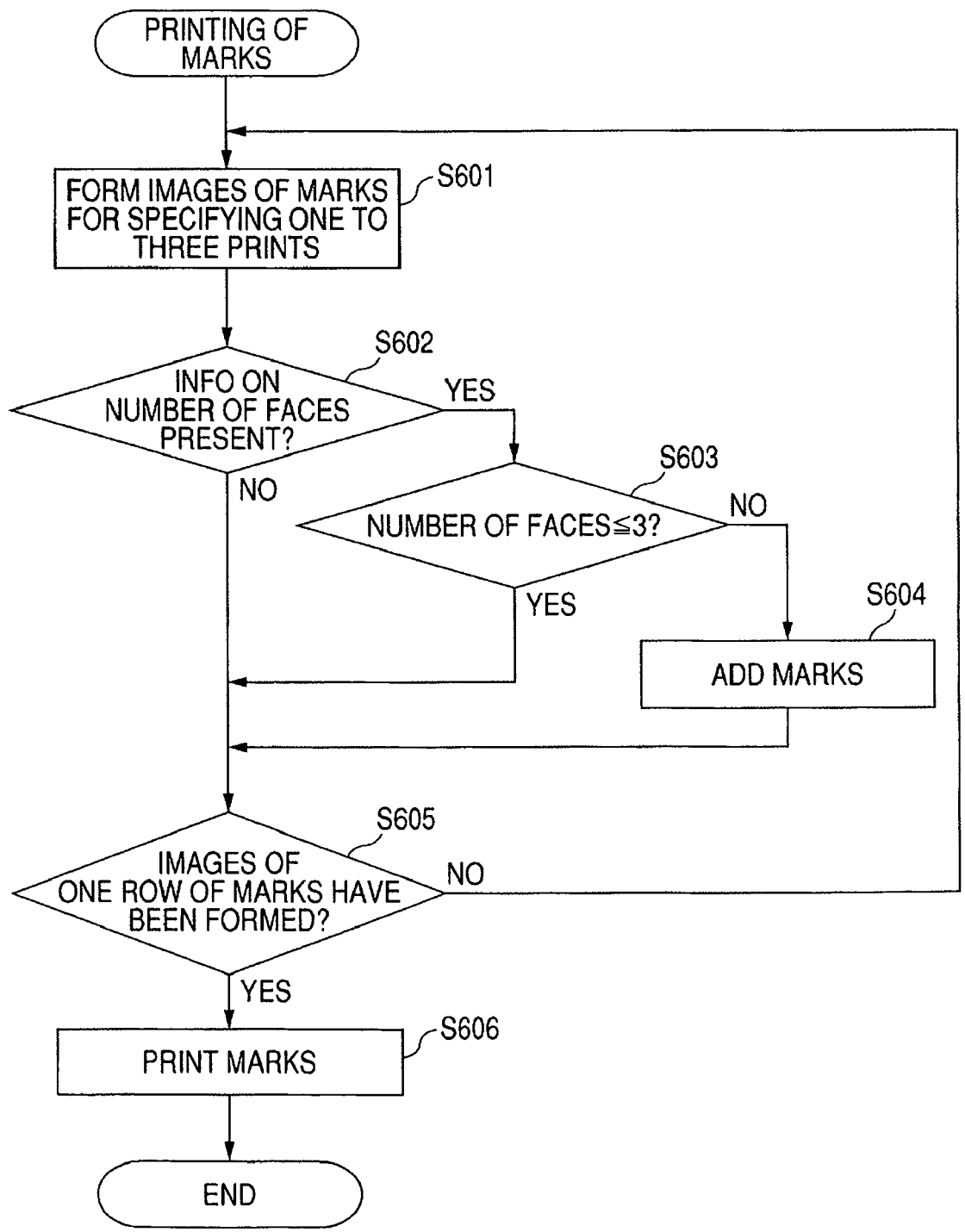
FIG. 6 is a flowchart showing the mark area formation process in the apparatus of FIG. 1.

The mark areas (C) for specifying the number of prints to be printed in step S503 described above is generated as shown in FIG. 4 by carrying out the process of FIG. 6 in the present embodiment.

Figure 4:
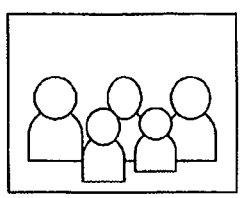
FIG. 4 is a descriptive diagram showing the mark sheet used by the apparatus of FIG. 1.
Figure 4:
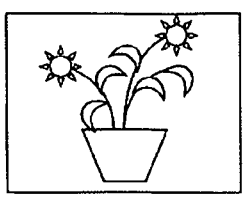
Figure 4:
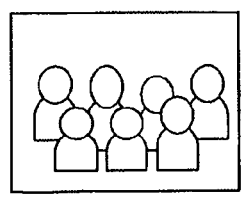
Figure 4:
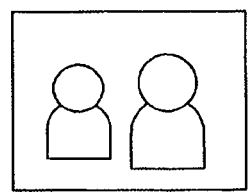

Here, for simplicity of description, a single row of thumbnails (B) is composed of four images as in FIG. 4, the mark areas C have four marks, and the three marks on the left side are (default) marks for specifying one, two, or three prints in the conventional manner. On the right side thereof in the present embodiment, a mark area for specifying the number of prints for the number of people (five people in the case of the image at the left end of the row in FIG. 4, for example) detected in the image by the above-described process for detecting the number of faces is dynamically generated in accordance with the image.

First, in step S601 of FIG. 6, images of the mark areas corresponding to one, two, and three prints of the first image to be printed on the left side of the mark area are created in the DRAM 102.

At this point, the number showing the number of prints is displayed in a dropout color inside the mark areas C. The term "dropout color" refers to a color that appears to be nearly white for the reader unit, even though it can be read by a human, when the mark sheet is read in the reader unit 108 after printing. More specifically, since the number of prints is printed in a light green color and the sheet is configured so that color filling of the mark area is determined by the green luminance output of the color reader unit, the number character showing the number of prints is not mistakenly recognized as a filling.

Next, in steps S602 and S603, the JPEG header portion of the image is examined and a determination is made as to whether information on the number of faces is present, and if information is present, then the number of faces is examined to determine if the number of faces is three or less. In the case that information on the number of faces in not present, the system advances to step S605 without adding a mark area because the image has not been subjected to the process for detecting the number of faces. Even in the case in which the number of faces is three or less, there is no need to add a mark area, so the system advances to step S605. When the information on the number of faces is a number that is four or higher, a mark area is added in step S604. This is a process for avoiding user confusion due to the creation of two mark areas with the same number when the number of faces is three or less.

The above-described process is repeated while confirming in step S605 whether a single row has been executed, and if a single row of marks has been generated, the mark areas generated in step S606 are printed.

As described above, mark areas C as in FIG. 4 can be generated in the lower section of the thumbnail images B. The mark area for specifying the number of prints for the desired number of people is automatically generated in accordance with the number of people in the photographic object detected from the image. In the present embodiment, since the required mark is added only when three or more people are detected, the mark sheet does not give the impression of being laborious.

In the example of FIG. 4, since the number of faces detected in the leftmost image is five, a mark area for the printing of this number of people, in other words, five prints, is added. The character number "5," which is the number of prints, is printed in the dropout color in the mark area. The user can thereby confirm the number of prints when filling in this area, and can intuitively and easily perform the marking work for specifying the number of prints.

Since the number of faces in the image of a flower, which is the second from the left in FIG. 4, is zero, a mark area is not added. Also, since the number of faces in the rightmost image in FIG. 4 is two (less than three), a mark is not added.

When the mark sheet is printed as described above, the user fills in the section for the number of prints that are desired, sets the mark sheet in the reader unit 108, and presses the mark sheet key 501 again from the operation unit 106.

In accordance with this operation, the CPU 100 causes the reader unit 108 to read the mark sheet. The control processing of the CPU 100 determines which thumbnail (B) and which mark area (C) for specifying the number of prints corresponding to the thumbnail (B) has been filled in with respect to the image thus read. When it has been determined that the mark area (C) for specifying the number of prints has been filled in, the control processing of the CPU 100 causes the recorder unit 107 to print the number of prints of the image. In the particular case that the mark area for specifying the number of people detected in accordance with the number of faces has been filled in, the number of faces in the image is set as the number of prints, and the image is printed for that number of people.

As described above, in accordance with the present embodiment, the format of the mark sheet for specifying the number of prints of the image of the photo to be printed can be suitably controlled.

In accordance with the present embodiment, since a mark area for specifying the number of prints for the desired number of people is added in accordance with the process for detecting the number of faces (number of people) in the image without increasing the number of marks of the mark area more than is required, printing for the desired number of people can be easily carried out while minimizing the reduction of the listing ability of the mark sheet. In other words, when a plurality of photos are printed for the desired number of people in the photos, the photos can be printed/output for the desired number of people in the photos by a simple operation whereby a mark area is marked for "printing for the desired number of people" corresponding to the desired photos on the mark sheet.

In accordance with the present embodiment, a mark area is provided for specifying a default number of prints, and in addition to the default mark area, a mark area is added only when necessary for specifying the number of prints for the number of people detected in the process for detecting faces. The number of prints for the number of people that is foreseen to be needed can be easily specified in a small surface area in the mark area without increasing the complexity of the mark sheet format.

Also, in accordance with the present embodiment, the process for detecting the number of faces (number of people) is carried out as an idle task in a standby state in which the user is not printing, copying, scanning, or performing other tasks. The time required to print a mark sheet can thereby be reduced, and the hardware of the apparatus can be effectively used. Therefore, in accordance with the present embodiment, after the mark sheet printing has been specified, there is no need to wait for the amount of time required to perform the process for detecting the number of faces (retrieve the number of faces), and the mark sheet printing operation can be started immediately after mark sheet printing has been specified.

In the present embodiment, the information on the number of faces (that is to say, the number of people in the photographic object) obtained in the process for detecting faces in the header of the image file (JPEG file in the example described above) is recorded. For this reason, there is no need to again detect the number of faces for an image file containing the information on this number, and the mark area for suitably specifying the number of prints can be rapidly printed on the mark sheet each time by using the printing process of FIG. 6. When the information on the number of faces in the image file is recorded, character strings for describing the meaning and other attributes of the information can be suitably recorded together with numerical values that express the number of faces as information on this number in order to enhance the utility of the information or maintain file compatibility.

In the present embodiment, a mark area is not added for image files in which information on the number of faces is not present. It is possible to carry out a process for detecting the number of faces in an image that does not have information on the number of faces, but since the detection process is time-consuming, a considerable amount of time is required to print a mark sheet when the process is performed at this point. In the present embodiment, priority is placed on the printing speed of the mark sheet, and faces are not detected while the mark sheet is being printed, but the when the hardware processing ability is sufficient (including future cases in which the processing ability of the hardware has improved), the number of faces may be detected as the mark sheet is being printed.

In the present embodiment, the number of faces is retrieved after the image data of the card slot 111 is copied to the storage 109, but since the present invention is not dependent on the type of storage device, it is also possible to directly retrieve the number of faces and to print the mark sheet for the images in the card slot 111.

Described above is an example in which the process for detecting the number of faces detects the areas deemed to be faces from an image in order to determine the number of prints that correspond to the number of people in the photographic object, but determining the number of prints corresponding to the number of people in a photographic object is not limited to the process for detecting the number of faces, and another suitable image processing method may be applied.

Embodiment 2

Another method for generating and printing a mark area (section C of FIG. 7) for specifying the number of mark sheets is described below with reference to FIGS. 8 and 9. Other than the configuration (hardware configuration, for example) shown below, this embodiment is the same as embodiment 1.

In embodiment 1, the number of marks in the mark area C is variable, as shown in FIG. 4, and the rightmost mark area is dynamically generated in accordance with the image in order to specify the number of prints for the number of people detected from the image by using the process for detecting the number of faces, which is carried out in the same manner as described above.

In contrast, the number (four in the example described below) of marks in the mark area C below the thumbnail area B is fixed in the present embodiment. When the faces are detected from the image by the process for detecting the number of faces, the rightmost marks are used as the marks for specifying the desired number of people. In this case, the number of prints that can be specified in the rightmost mark area is the number corresponding to the number of detected faces.

When faces cannot be detected from the image by the process for detecting the number of faces, the default number of prints (four prints in the example below) to be specified by the marks can be selected.

Figure 8:
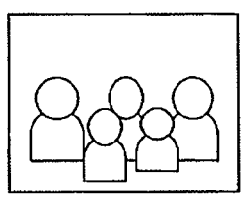
FIG. 8 is descriptive diagram showing another configuration of the mark sheet used by the apparatus of FIG. 1.
Figure 8:
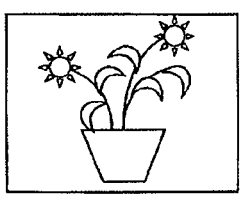
Figure 8:
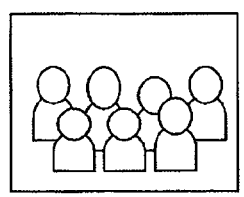
Figure 8:
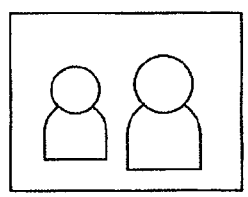
Figure 9:
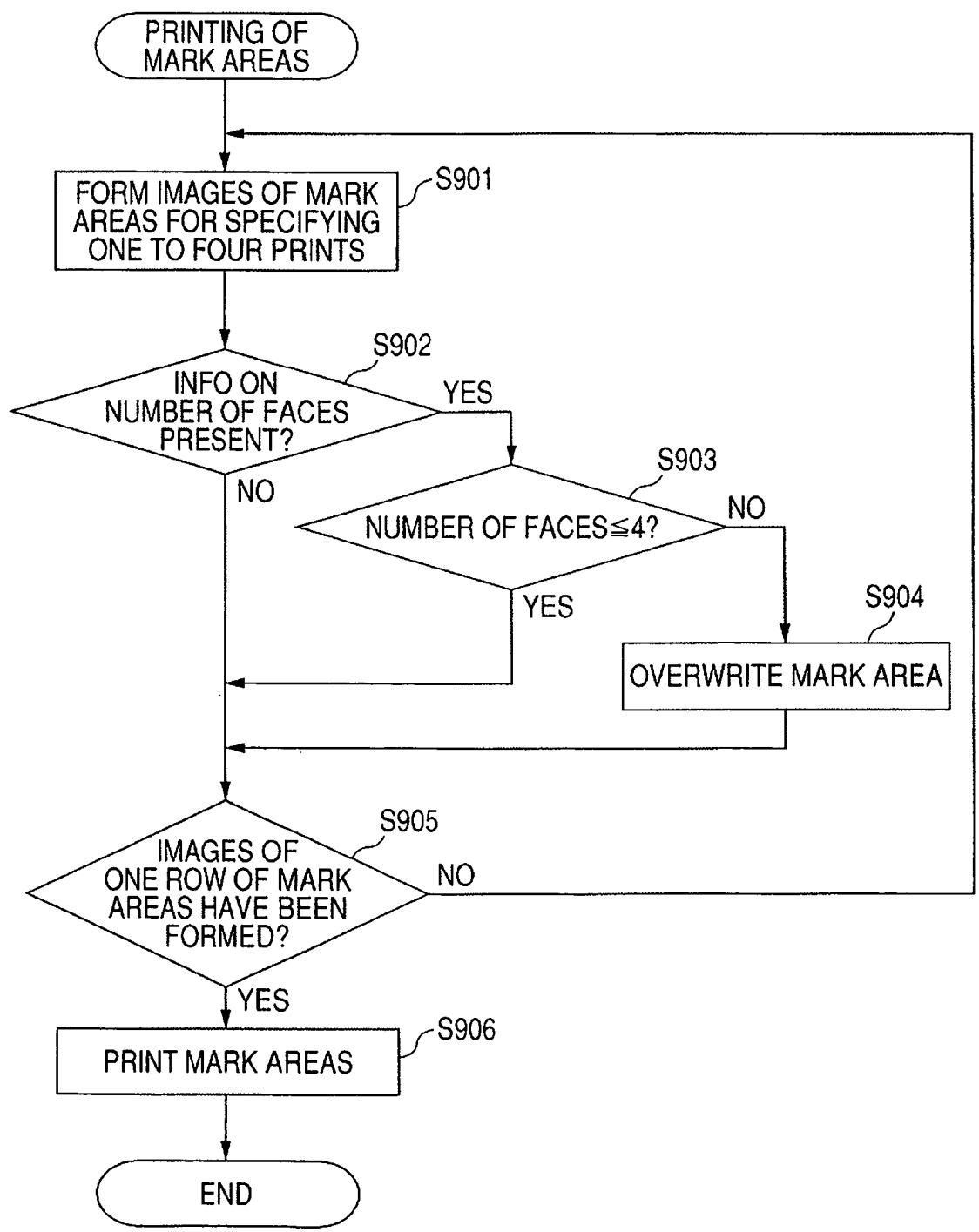
FIG. 9 is a flow chart showing the mark area formation process of the mark sheet of FIG. 8.

A processesuch as that shown in FIG. 9 is carried out instead of the process of FIG. 6 in order to generate a mark area such as that of FIG. 8.

First, in step S901, four images (the number is fixed at four in the present embodiment) of the mark area corresponding to one to four prints of the image to be printed are created in the DRAM 102. In this case, the number of prints that can be specified is shown by printing the number using a dropout color inside the mark area, as shown in FIG. 8.

Next, in step S902, the JPEG header portion of the image is examined, and a determination is made whether information on the number of faces is present. When information on the number of faces is not present in the JPEG header, the image has therefore not been subjected to the process for detecting the number of faces, and the system advances to step S905 without modifying the image of the mark area generated in step S901.

Also in the case in which the number of faces is four or less in step S903, printing for the desired number of people is possible without modifying the image of the mark area, so the system advances to step S905 without making modifications.

Conversely, when the information on the number of faces is a number that is five or higher in step S903, the image of the mark area is modified in step S904 so that the rightmost mark area for "four prints" is set to be the mark area for "print for the desired number of people."

In the leftmost image of FIG. 8, since the number of detected faces is five, for example, the number character this is printed in the dropout color in the rightmost mark is changed from "4" to "5," and is changed to the mark area for five prints. The number character "5," which is the number of prints, is thereby printed in the dropout color in the rightmost mark area. Based on this mark area, the user can confirm the number of prints when the area is filled in.

Since seven faces are detected in the third image from the left in FIG. 8, the number character "7," which is the number of prints, is printed in the dropout color in the rightmost mark area by using the same process.

Since the number of faces in the image of a flower, which is the second from the left in FIG. 8, is zero, and the number of faces in the rightmost (fourth) image is two (4), the mark area is not modified, and the character number showing the number of prints in the dropout color is left as the "4" generated in the step S901.

The above process is repeatedly executed until it can be confirmed that a single row of images has been processed in step S905, and the image of the mark areas C in their final state is thereafter printed in step S906.

The user selects those marks that correspond to the number of image prints to be made, fills in the marks on the mark sheet printed as described above, sets the mark sheet in the reader unit 108 (FIG. 1), and presses the mark sheet key 501 (FIG. 2) again from the operation unit 106.

In response to the above, the CPU 100 determines which mark area has been filled in, and a processesuch as the following is carried out when the rightmost mark area has been filled in.

First, when the number of faces is recorded in the JPEG header of the image data, it is determined that the rightmost mark area has been modified for printing for the desired number of people, the number of faces recording in the JPEG header of the image data is set as the number of prints, and the image is printed.

Conversely, when the number of faces is not recorded in the JPEG header of the image data, it is determined that the filled-in rightmost mark has not been modified for printing in accordance with the desired number of people, the default number of prints (four in the present embodiment) indicated in the rightmost mark is set as the number of prints, and the image is printed.

In the present embodiment as well, the mark area is not modified for images that do not have information on the number of faces. The number of faces in the images that do not have information of the number of faces can be detected during mark area formation, but since the detection process is time-consuming, a considerable amount of time would be required to print the mark sheet if the process is executed at this point. In the present embodiment, priority is placed on the printing speed of the mark sheet, and faces are not detected while the mark sheet is being printed, but the when the hardware processing ability is sufficient, the number of faces may be detected as the mark sheet is being printed, and this point is the same in the present embodiment.

In the present embodiment, the number of faces is retrieved after the image data of the card slot 111 is copied to the storage 109, but since the present invention is not dependent on the type of storage device, it is naturally possible to retrieve the number of faces and to print the mark sheet for the images in the card slot 111.

Also described in the present embodiment is an example in which the process for detecting the number of faces detects the areas deemed to be faces from an image in order to determine the number of prints that correspond to the number of people in the photographic object. However, determining the number of prints corresponding to the number of people in the photographic object is not limited to the process for detecting the number of faces, and another suitable image processing method may naturally be applied.

A mark area for specifying the number of prints corresponding to the number of faces may be disposed on the mark sheet by using a method such as the one described above, and an apparatus can be provided for printing the number of faces as the number of prints when the areas are individually marked.

In accordance with the present embodiment, the number of marks in the mark area for specifying the number of prints is fixed. Therefore, in addition to the effects described in embodiment 1, there is an advantage in that the picture of the printed mark sheet is clean and can be easily viewed, and that the marking work can be carried out in a simple manner. Also, it is apparent from a comparison with FIG. 6 that the load on the CPU processing is kept to a substantially equivalent amount.

Specific marks (rightmost marks in FIG. 8) on the paper surface of the mark sheet can be shared as marks that specify the number of prints for the desired number of people or as marks that specify a default number of prints (four in the present embodiment). In the case that the mark is filled in when the images are printed, the information on the number of people in the image header is used to make a determination as to whether the mark specifies the number of prints for the desired number of people or whether the mark specifies the default number of prints. For this reason, there is no need to record extra information on the mark sheet in addition to the information described above, or to reading this information to determine the number of prints.

The present invention is not limited by the product name (MFP (Multi Function Printer) in the embodiments, for example) or other attributes of the image processing apparatus, and can be applied to image processing apparatuses having an image reading means and an image recording means. The control program of the present invention can be stored in the ROM or another medium of an image processing apparatus when the image processing apparatus is shipped, or may be loaded on the apparatus from an external storage medium (CDROM, flexible disk, or the like). The control program of the present invention may furthermore be downloaded from any server by way of a network.

This application claims priority from Japanese Patent Application No. 2004-359287 filed Dec. 13, 2004, which is hereby incorporated by reference herein.

What is claimed is:

1. An image processing method for processing an image that is to be printed by a printing apparatus and is to be specified based on information stated on a mark sheet read by a reading apparatus, the method comprising:

analyzing the image to be printed and detecting the number of people in the photographic object in the image;

causing a printing apparatus to print a mark sheet comprising a thumbnail image indicating the image and mark areas in which the number of prints can be specified, the mark areas including a default mark area corresponding to a fixed number of prints of the image and a specific mark area for acquiring the number of prints of the image corresponding to the number of people in the photographic object detected from the image; and acquiring the number of prints of the image corresponding to the number of people in the photographic object detected from the image when the specific mark area marked on the mark sheet is read by a reading apparatus, wherein, in a case where the number of people in the photographic object detected from the image is more than a predetermined number, the number of the mark areas provided in correspondence to the thumbnail image is limited to less than the number of prints of the image corresponding to the number of people.

2. The image processing method according to claim 1, wherein the number of people in the photographic object is detected by detecting the number of faces in the image.

3. The image processing method according to claim 1, wherein the number of people in the photographic object is detected as an idle task of the image processing apparatus.

4. The image processing method according to claim 1, wherein the default mark area that can specify the number of prints up to a predetermined number of prints is provided as the mark area of the mark sheet, and the specific mark area for specifying the number of prints corresponding to the number of people is further provided only when the number of people in the photographic object that are detected from the image exceeds the predetermined number of prints.

5. The image processing method according to claim 1, wherein the detected information indicating the number of people in the photographic object is stored as header information in the image file of the image.

6. The image processing method according to claim 1, wherein the default mark area that can specify the number of prints up to a predetermined number of prints is provided as a mark area of the mark sheet, and the specific mark area of the mark area is generated as a mark area for specifying the number of prints for the number of people whether or not the number of people in the photographic object detected from the image exceeds the predetermined number of prints.

7. The image processing method according to claim 6, wherein the number of prints corresponding to the number of people is selected if information indicating the number of people in the photographic object detected in the image is acquired, and the predetermined number of prints is selected if information indicating the number of people in the photographic object is not acquired.

8. An image processing apparatus for processing an image that is to be printed by a printing apparatus and is to be specified based on information stated on a mark sheet read by a reading apparatus, the apparatus comprising:

an analyzing unit configured to analyze the image to be printed and to detect the number of people in the photographic object in the image;

a print control unit configured to cause a printing apparatus to print a mark sheet comprising a thumbnail image indicating the image and mark areas in which the number of prints can be specified, the mark areas including a default mark area corresponding to a fixed number of prints of the image can be specified and a specific mark area for acquiring the number of prints of the image corresponding to the number of people in the photographic object detected from the image by the analyzing unit; and an acquiring unit configured to acquire the number of prints of the image corresponding to the number of people in the photographic object detected from the image by the analyzing unit when the specific mark area marked on the mark sheet is read by a reading apparatus, wherein, in a case where the number of people in the photographic object detected from the image by the analyzing unit is more than a predetermined number, the print control unit provides the mark areas less than the number of prints of the image corresponding to the number of people in correspondence to the thumbnail image.

9. A computer-readable storage medium storing a computer-executable control program for causing the image processing apparatus to implement the image processing method according to claim 1.

* * * * *